United States Patent [19]
Lydick

[11] 3,835,116
[45] Sept. 10, 1974

[54] VINYL HALIDE PLASTISOL COMPOSITIONS CONTAINING A CARBOXYLIC POLYMER

[75] Inventor: Leslie B. Lydick, Lorain, Ohio

[73] Assignee: The B. F. Goodrich Company, New York, N.Y.

[22] Filed: June 25, 1973

[21] Appl. No.: 373,093

[52] U.S. Cl... 260/17.4 SG, 260/17.4 ST, 260/31.6, 260/31.8 M, 260/45.7 R, 260/899
[51] Int. Cl... C08b 25/00, C08f 29/24, C08f 29/50, C08f 45/40
[58] Field of Search..... 260/17.4 SG, 17.4 ST, 31.6, 260/31.8 M, 899

[56] References Cited
UNITED STATES PATENTS

| | | | |
|---|---|---|---|
| 3,012,001 | 12/1961 | Smith | 260/31.8 |
| 3,427,382 | 2/1969 | Haefele | 260/17.4 |
| 3,558,537 | 1/1971 | Hecker | 260/899 |
| 3,635,856 | 1/1972 | Kaneko et al | 260/17.4 |
| 3,657,381 | 4/1972 | Speitel | 260/31.8 |

*Primary Examiner*—William H. Short
*Assistant Examiner*—Edward Woodberry
*Attorney, Agent, or Firm*—Roy P. Wymbs

[57] ABSTRACT

There is disclosed new compositions comprising a vinyl halide plastisol, free of water, having incorporated therein a carboxylic polymer, and a suitable neutralizing agent, said polymer being one obtained by copolymerizing a carboxylic monomer, such as acrylic acid, with certain proportions of a polyalkenyl polyether of a polyhydric alcohol containing more than one alkenyl ether grouping per molecule, the parent polyhydric alcohol containing at least four carbon atoms and at least three hydroxyl groups. These compositions have a high yield and little or no dilatancy. The process for making such compositions is likewise covered.

18 Claims, No Drawings

VINYL HALIDE PLASTISOL COMPOSITIONS CONTAINING A CARBOXYLIC POLYMER

BACKGROUND OF THE INVENTION

Many and varied substances have been utilized as thickening and bodying agents in such applications as printing pastes, textile sizes, latex creaming, latex coating and impregnating compositions, and in various medicinal and pharmaceutical applications such as creams, pastes, jellies, ointments, and the like. Substances used as thickening agents are, in general, soluble in water and their function is to materially increase the viscosity or "thickness" of the liquid through a solution effect without substantial change in its flow properties.

Substances used as bodying agents, on the other hand, are generally more or less insoluble in water and produce compositions which are much more viscous than those secured with the same amount of mere thickening agents. In fact, such compositions are oftens so viscous as to have a gel-like structure, showing considerable elastic behavior and typical Bingham body flow, that is, a definite yield point. In other words they form jelly-like or mucilage type compositions. The usual thickening agents soluble in water are gum arabic, gum shiraz, starch, and ordinary sugar, soluble alginates, polyvinyl alcohol, polyacrylic acid and its alkali salts, soluble cellulose derivatives, such as carboxymethyl cellulose, and the like. The bodying agents are substantially insoluble natural gums, such as gum karaya, gum tragacanth, gum bassora, locust bean gum, insoluble alginates, agar-agar, and the like.

Since the naturally occurring gum-like materials, varied so in price and were at times difficultly obtainable, various synthetic materials and chemically modified natural products were employed as natural gum substitutes. However, in spite of their uniformity of properties and generally lower cost, they were not considered to be the full equivalent of the natural gums in most of the important applications. Thereafter it was discovered that certain water-insoluble, crosslinked polymers of carboxylic acids and anhydrides, and especially the salts thereof with monovalent bases or alkalis, could be converted into mucilaginous compositions when swollen with water or other aqueous medium to a gel-like state and then mixed to a creamy consistency. These polymers have proved to be most successful commercially when employed as a swelling agent with water or other aqueous medium.

There are many uses, however, for such mucilaginous compositions wherein a nonaqueous medium is employed, such as an oil medium or a liquid plasticizer medium. However, efforts to employ cross-linked polymers of carboxylic acids and anhydrides as thickening agents in an oil medium or a liquid plasticizer medium have been unsuccessful in that proper yields were not obtainable in the resultant composition and also, the dilatancy problem in the resultant composition was very bad. On the other hand, useful aqueous compositions of vinyl halide plastisols containing a cross-linked polymer of carboxylic acid or anhydride as thickening agent are known, that is an aqueous dispersion of the vinyl halide polymer and plasticizer therefor having the thickening agent added thereto. It would be most desirable from a commercial standpoint if one could obtain a vinyl halide plastisol with a high yield and with little or no dilatancy in a nonaqueous medium, that is, with plasticizer but no water. "Dilatancy" refers to that property of a material of increasing in viscosity and setting to a solid as a result of deformation by expansion, pressure or agitation. "Yield", as employed herein, refers to resistance to flow.

SUMMARY OF THE INVENTION

I have unexpectedly found that a vinyl halide plastisol composition, free of water, having a high yield and little or no dilatancy can be produced by mixing with a plastisol, comprising a vinyl halide polymer and a plasticizer therefor, a cross-linked polymer of a carboxylic acid or anhydride and thereafter adding to said composition a suitable neutralizing agent for said cross-linked polymer.

DETAILED DESCRIPTION

In the practice of the present invention, the vinyl halide plastisol employed is one that is made in the usual fashion by forming a suspension of a vinyl halide polymer in a liquid plasticizer therefor. The vinyl halide polymers contemplated herein include the thermoplastic, resinous homopolymers of vinyl chloride, vinyl bromide and vinyl fluoride. Also included herein are the resinous copolymers of one of the aforesaid vinyl halides with one or more monomers having a -CH = C< grouping which are copolymerizable therewith and wherein the vinyl halide constituent units comprise at least 50% of the copolymer. Suitable monomers for copolymerization with the vinyl halides include vinylidene chloride, vinylidene bromide, vinylidene fluoride, chlorotrifluoro ethylene, 1,2-dichloroethylene, tetrafluoroethylene, and the like; the vinyl esters such as vinyl acetate, vinyl propionate, vinyl butyrate, vinyl benzoate, vinyl laurate, isopropenyl acetate, isopropenyl caproate, and the like; the acrylate and methacrylate esters such as methyl acrylate, ethyl acrylate, propyl acrylate, isopropyl acrylate, the butyl acrylates, the amyl acrylates, the hexyl acrylates, the heptyl acrylates, the octyl acrylates, the dodecyl acrylates, phenyl acrylate, cyclohexyl acrylate, methyl methacrylate, ethyl methacrylate, the propyl methacrylates, the butyl methacrylates, the amyl methacrylates, the hexyl methacrylates, the heptyl methacrylates, the octyl methacylates, the nonyl methacrylates, the decyl methacrylates, the dodecyl methacrylates, phenyl methacrylate, cyclohexyl methacrylate, and the like; the maleate and fumarate esters such as diethyl maleate, the dipropyl maleates, the dibutyl maleates, the diamyl maleates, the dihexyl maleates, the dioctyl maleates, the dilauryl maleates, dimethyl fumarate, diethyl fumarate, the dipropyl fumarates, the dibutyl fumarates, the diamyl fumarates, the dihexyl fumarates, the diheptyl fumarates, the dioctyl fumarates, the didecyl fumarates, dicyclohexyl fumarate, diphenyl fumarate, and the like; the vinyl aromatic monomers such as styrene, alpha-methyl styrene, the vinyl toluenes, the vinyl xylenes, vinyl naphthalene, and the like; the monoolefins such as ethylene, propylene, the butylenes, the amylenes, the hexylenes. cyclohexene, and the like; the vinyl ethers, such as vinyl methyl ether, vinyl ethyl ether, the vinyl propyl ethers, the vinyl butyl ethers, the vinyl amyl ethers, the vinyl hexyl ethers, the vinyl heptyl ethers, the vinyl octyl ethers, vinyl cyclohexyl ether, vinyl phenyl ether, vinyl benzyl ether, and the like; the allyl esters and ethers such as allyl acetate, allyl laurate, allyl benzoate, allyl methyl ether, allyl ethyl ether, and the like; vinyl cyamides such as acrylonitrile, methacrylonitrile, vinylidene cyanide, and the like, and others.

The vinyl chloride homopolymers and copolymers are the preferred resins embodied herein. Most preferred in this invention is an emulsion polymerized, dispersion grade homopolymer of vinyl chloride. Most preferred among the vinyl halide copolymers are the interpolymers of from 70% to 100% by weight of vinyl chloride and from 0 to 30% by weight of at least one other monomer selected from the group recited above.

The vinyl halide plastisols used in the compositions of the instant invention are made by uniformly blending or intimately mixing, by conventional means, with 100 parts by weight of the vinyl halide polymer in powder form from about 30 to about 100 parts by weight of one or more liquid plasticizers containing a chemically-bound carboxyl group. The liquid plasticizers useful in this invention may be described as the alkyl and alkoxy alkyl esters of dicarboxylic acids or the esters of a polyhydric alcohol and a monobasic acid and they include such materials as dibutyl phthalate, dioctyl phthalate, dibutyl sebacate, dinonyl phthalate, di (2-ethyl hexyl) phthalate, di (2-ethyl hexyl) adipate, glyceryl stearate, and the like. The preferred plasticizers are the liquid diesters of aliphatic alcohols having from 4 to 20 carbon atoms and dibasic carboxylic acids having from 6 to 14 carbon atoms.

The carboxylic polymers useful in the practice of the present invention are those obtained when a carboxylic monomer, such as acrylic acid, maleic acid or anhydride, and the like, is copolymerized with certain proportions of a polyalkenyl polyether of a polyhydric alcohol containing more than one alkenyl ether grouping per molecule, the parent polyhydric alcohol containing at least 4 carbon atoms and at least three hydroxyl groups. In the preparation of such carboxylic polymers, it is desirable to utilize, as the carboxylic monomer, one or more alpha-beta unsaturated carboxylic acids containing at least one carboxyl group, with the olefinic double bond alpha-beta to at least one carboxyl group. Illustrative alpha-beta unsaturated carboxylic acids include acrylic acid, methacrylic acid, ethacrylic acid, alpha-chloro acrylic acid, alpha-cyano acrylic acid, and others; crotonic acid, alpha-phenyl acrylic acid, and others; hydrosorbic acid, alpha-butyl crotonic acid, angelic acid, cinnamic acid, m-chloro cinnamic acid, p-chloro cinnamic acid, umbellic acid, and other monoolefinic monocarboxylic acids; maleic acid, fumaric acid, hydromuconic acid, glutaconic acid, itaconic acid, citraconic acid, mesaconic acid, tricarboxy ethylene, tetracarboxy ethylene, and other monoolefinic, di- and polycarboxylic acids; sorbic acid, beta-acryloxy acrylic acid, beta styryl acrylic acid (4-phenyl-1-carboxy butadiene-1,3) and other polyolefinic monocarboxylic acids; and maleic anhydride and other acid anhydrides.

The preferred carboxylic monomers are the monoolefinic acrylic acids having the general formula

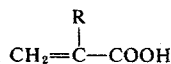

wherein R is a substituent selected from the class consisting of hydrogen, halogen, hydroxyl, lactone, lactam and the cyanogen (—C≡N) groups, monovalent alkyl radicals, monovalent aryl radicals, monovalent aralkyl radicals, monovalent alkaryl radicals and monovalent cycloaliphatic radicals. Illustrative acrylic acids of this preferred class are, in addition to acrylic acid, methacrylic acid, ethacrylic acid, chloroacrylic acid, bromoacrylic acid, cyano-acrylic acid, alphaphenyl acrylic acid, alpha-benzyl acrylic acid, alpha-cyclohexyl acrylic acid, and others. Alpha-halo acrylic acids readily hydrolyze at the halogen substitution with the formation of hydroxyl and lactone groups. Of this class, acrylic acid itself is most preferred because of its generally lower cost, ready availability, and ability to form superior polymers. Another particularly preferred carboxylic monomer is maleic anhydride.

The polyalkenyl polyethers useful in making the carboxylic polymers are those which contain more than one alkenyl ether grouping per molecule and those most useful possess alkenyl groups in which an olefinic double bond is present attached to a terminal methylene grouping thusly $CH_2 = C<$. They are made by the etherification of a polyhydric alcohol containing at least four carbon atoms and at least three hydroxyl groups. Compounds of this class are readily produced, for example, by a Williamson-type synthesis, in which an alkenyl halide, or a mixture of such halides, such as allyl chloride, allyl bromide, methallyl chloride, methallyl bromide, and others, is reacted with a strongly alkaline aqueous solution of one or more of the polyhydric alcohols. The product of such a synthesis usually is a complex mixture of polyethers containing varying numbers of ether groups on each molecule. Analysis of such materials, therefore, reveals only the average number of ether groupings on each molecule. These mixtures, however, if they analyze as containing an average number of ether groups per molecule greater than one, are capable of producing the insoluble carboxylic polymers useful in the present invention. Since the efficiency of the polyether cross-linking agent increases with the number of potentially polymerizable groups on the molecule, it is much preferred to utilize polyethers containing an average of two or more alkenyl ether groupings per molecule.

Illustrative polyhydric alcohols of the abovedescribed class that may be utilized in the preparation of the polyalkenyl polyether cross-linking agent include the butane triols, such as 1,2,3-butane triol, 2,3,4-trihydroxy butyric acid, the aldotetroses, such as erythrose and threose, ketotetroses, such as erythrulose; the aldopentoses, such as arabinose, xylose, lyxose, and ribose; ketopentoses such as araboketose and xyloketose; aldohexoses, such as glucose, galactose, mannose, gulose, idose, talose, allose, and the like; ketohexoses, such as fructose or levulose, sorbose, and the like; other sugars including the mono-, di-, tri- and polysaccharides such as sucrose, maltose, lactose and raffinose; the hexosans, pentosans and hexosanpentosans, the galactomannan and glucomannan gums, starch, and others; reduced forms of the above and other sugars and polysaccharides such as the so-called "sugar alcohols", erythritol, xylitol, mono-, di- and tri-pentaerythritol, arabitol, mannitol, iditol, tolitol, sorbitol, inositol, dulcitol, and others; the oxidized derivatives of the sugars in which the oxidation has not been carried to the point where the original monosaccharide carbon chain unit is broken such as the mono- and dicarboxylic "sugar acids" including gluconic acid, glucuronic acid, galactonic acid, galacturmic acids, saccharic acid, mucic and pectic acids and other polyhydric alcohols of the class described.

The preferred class of polyhydric alcohols for use in the production of the polyalkenyl polyether monomer is known as the oligosaccharides, which are defined as containing from one to four monosaccharide units. In addition to the oligosaccharides themselves, their reduction products, such as the alcohols, keto-alcohols and aldo-alcohols and their oxidation products which retain the original saccharide chain, such as the sugar acids, the keto-acids, the aldo-acids, and the like can be used. Illustrative saccharides of this class are the monosaccharides, such as glucose, galactose, fructose, sorbose, rhamnose, and the like, disaccharides such as sucrose, arabinose, maltose, lactose, and the like, trisaccharides such as raffinose, and others. Of these the disaccharide, sucrose, is the most preferred because of its ready availability and its ability to produce polyethers of great reactivity with carboxylic monomers.

In the preparation of the carboxylic polymers, the two essential monomeric ingredients, namely, the carboxylic monomer and the polyalkenyl polyether, should be present in certain proportions, although the exact proportions will vary considerably depending on the characteristics desired in the polymer. Two-component monomeric mixtures of the carboxylic monomer and the polyalkenyl polyether monomer containing more than 50 to 70 percent by weight of the polyalkenyl polyether do not polymerize readily with free-radical type catalysts and yields of polymer are generally low. On the other hand smaller amounts of the polyalkenyl polyether copolymerize quite readily with carboxylic monomers and the cross-linking effect of the polyalkenyl polyether on the carboxylic monomer is so strong that as little as 0.1 percent by weight thereof, based on the total mixture, produces a great reduction in the water- and solvent-solubility of the polymer. Accordingly, the monomeric mixture must contain not less than 0.1 percent by weight of the total monomers and not more than 10 percent, preferably not more than 6 percent, of the cross-linking agent in order to produce the desired water insolubility and high swelling characteristics. This means, of course, in a two-component interpolymer or copolymer that the remainder of the monomeric mixture will consist of 90 to 99.9 percent by weight, and preferably 94 to 99.9 percent by weight of the carboxylic monomer. A preferred range of cross-linking agent is 0.1 percent to 4.0 percent, and even more preferred, 0.2 percent to 2.5 percent, by weight of the total monomers. This is especially true when the acrylic acids are being employed. Here again, the remainder of the monomeric mixture to be polymerized will consist of one or more carboxylic monomers. It should be realized that the precise amount of any cross-linking agent within these ranges to be employed will depend first on the characteristics desired in the polymer being produced and also on the particular polymerization solvent or medium employed. The solubility of the monomeric mixture, and particularly of the cross-linking agent, in the polymerization medium appears to have a considerable effect on the amount and distribution of cross-linking obtained with a given amount of cross-linking agent within the above broad range.

When 0.1 percent to 6.0 percent by weight, and preferably 0.2 percent to 5.0 percent by weight, of the polyalkenyl polyether cross-linking agent is copolymerized with maleic anhydride, for example, high-swelling insoluble polymers are also obtained. Also, multi-component interpolymers may be utilized in the present invention, that is, where one or more polymerizable monomers are employed in addition to the carboxylic monomer and the polyalkenyl polyether. In these interpolymers the carboxylic monomer or monomers should never be less than 25 percent, and preferably not less than 40 percent by weight of the total monomeric mixture. Multi-component interpolymers may be made from monomeric mixtures comprising from 25 percent to 95 percent of a carboxylic monomer such as acrylic acid, 0.1 percent to 30 percent of a polyalkenyl polyether such as polyallyl polyether of sucrose, and 5 percent to 74.9 percent of an additional monomer or monomers, all of said percentages being by weight based on the total weight of the monomeric mixture. Various additional examples of carboxylic polymers, as described herein, and convenient methods for the preparation of all the carboxylic polymers referred to, are shown and described in U.S. Pat. No. 2,798,053.

The compositions of the present invention are prepared by mixing or blending the ingredients thereof by means of well known mixing or blending apparatus, such as a planetary mixer, a Banbury mixer, a Cowles mixer, a Hobart mixer, a sigma blade mixer, and the like. While the temperature of mixture is not critical, usually a mixing temperature in the range of 20°C. to 45°C. is desirable to obtain good homogeneous mixing or blending. The vinyl halide polymer and plasticizer are premixed to form the vinyl halide plastisol and then the carboxylic polymer is mixed therewith along with a suitable neutralizing agent for the carboxylic polymer. If desired, one may mix a blend together as separate ingredients the vinyl halide polymer, the plasticizer therefor, the carboxylic polymer and the neutralizing agent. However, the best results are obtained when the vinyl plastisol is formed first, as aforesaid, before adding the other components of the inventive composition.

In order to obtain compositions having the desired high yield and with little or no dilatancy, it is necessary that the neutralizing agent be added to the composition as the last component thereof. The amount of neutralizing agent or neturalizer used in order to obtain the desired results will vary over a wide range depending upon the particular carboxylic polymer employed, the amount thereof, the ultimate yield desired or required, and the like. Usually, however, an amount of neutralizer in the range of about one part by weight to about ten parts by weight, based on the total weight of the composition, is sufficient. Preferably the neutralizer is employed in the range of about one part by weight to about six parts by weight, based on the total weight of the composition.

Among the suitable neutralizing agents for use in the present compositions are the monovalent alkaline materials, such as, for example, ammonia, sodium hydroxide, sodium oxide, sodium carbonate, sodium bicarbonate, potassium hydroxide, potassium oxide, potassium carbonate, potassium bicarbonate, the hydroxides, oxides, carbonates, and bicarbonates of lithium, rubidium and cesium, and others; basic organic amines such as long chain aliphatic primary, secondary and tertiary amines and quaternary amines and alkylene oxide treated amines of this type, containing from 6 to 30 carbon atoms or more. Preferably the amines contain from 10 to 30 or more carbon atoms. The most preferred neutralizers of this type are the ethylene oxide condensates of the latter class of long chain amines, specific examples thereof including n-hexyl amine, n-octyl amine, tri-n-octyl amine, n-decyl amine, di-n-decyl amine, n-dodecyl amine, di-n-dodecyl amine, stearyl amine, ethylene oxide/dodecylamine condensates, and tetraalkyl ammonium hydroxides, such as tetraoctyl ammonium hydroxide and tetradodecyl ammonium hydroxides. The preferred amines are the dodecyl amines and the amine/ethylene oxide condensates of the formula:

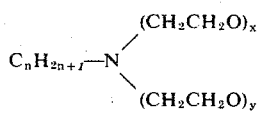

wherein $n$ is a number between about 10 and about 15 and $x+y$ equals about 15. Such compounds may have molecular weights in the range of between about 750 and about 1,500. One very successful neutralizing agent that has been employed and one that is readily available and easy to handle is "Ethomeen C-25" which is coconut oil ethoxylated with 25 mols of ethylene oxide. It is to be noted that more than one of any of the neutralizers listed may be employed in the composition, if desired.

If desired, various additives may be employed in the compositions of the instant invention, such as pigments, fillers, stabilizers, flame retarding agents, dyeing adjuvants, and the like. For example, usually when employing polyvinyl chloride in the vinyl halide plastisol, the conventional additive compounds useful as heat and light stabilizers are employed. Examples of such stabilizers are the barium, cadmium, zinc, tin and lead salts of monocarboxylic acids and mixtures thereof, and the alkyl derivatives of tin, such as the dialkyl tin mercaptides and thiazoles. Generally, from about 0.5 part to about 5 parts by weight, based on the weight of the vinyl halide plastisol, of the stabilizer is employed. Preferably there is employed a level of from about 1 to about 3 parts by weight of an inorganic basic lead stabilizer, such as basic lead carbonate, dibasic lead phosphite, dibasic lead phthalate, tribasic lead sulfate, lead salicylate, lead stearate, dibasic lead stearate, tribasic lead maleate, basic lead silicate, and the like. Most preferred of the basic lead salts because of its relative cheapness and ready availability is basic lead carbonate.

Yield, as previously pointed out, is simply defined as resistance to flow and is normally determined numerically through viscosity measurements employing well known standard techniques. Normally such values are arrived at by calculation from viscosity measurements using a Brookfield Model RVF Viscometer according to ASTM method D1824-61T. In the present invention, the yield of the compositions is expressed as a "yield ratio" which is determined from viscosity measurements of the compositions at varying r.p.m.'s (revolutions per minutes) after initial preparation and at intervals of aging. The viscosity is measured in centipoises (cps) at a temperature of 23°C. For the purposes of the instant invention, viscosity measurements were made at 2 rpm and 20 rpm and are expressed herein as $V_2$ and $V_{20}$, respectively. Taking the value of $V_{20}$ as one, the ratio $V_2/V_{20}$ was determined. With compositions heretofore obtainable by prior art methods this ratio is normally 1 to 1.5/1.0. Unexpectedly, by means of the present invention, ratios of $V_2/V_{20}$ in the range of 2.5 to 5.0/1.0 are obtainable giving compositions having a very high yield value and more importantly, with little or no dilatancy.

In order to more specifically define the present invention, the following examples are given merely by way of illustration and not limitation. In the examples, all parts and percents are by weight, unless otherwise indicated.

EXAMPLE I

In this Example there was employed polyvinyl chloride prepared by a standard aqueous dispersion method. 100 parts of polyvinyl chlroide was mixed with 58 parts of dioctyl phthalate plasticizer to give the vinyl halide plastisol. To the plastisol was added 2 parts of Dythal (a dibasic lead salt stabilizer sold by National Lead Company) and 2 parts of a cross-linked carboxyl polymer made from 98 percent acrylic acid and 2 percent allyl sucrose. As a last ingredient there was added to the mixture 6 parts of Ethomeen C-25 neutralizer (coconut oil ethoxylated with 25 mols of ethylene oxide). The above ingredients were mixed in a Cowles mixer at a temperature of 39.5°C. The composition of the above ingredients were so mixed to give the following recipe I, in which all parts are based on the total weight of the composition, along with a control recipe, mixed in the same manner but without the carboxyl polymer and neutralizer:

|  | Control | I |
|---|---|---|
| Polyvinyl chloride | 100 pts. | 100 pts. |
| Dioctyl phthalate | 58 | 58 |
| Dythal | 2 | 2 |
| Carboxyl polymer | — | 2 |
| Ethomeen C-25 | — | 6 |

Samples were taken from both compositions and viscosity measurements made using a Brookfield Model RVF Viscometer with the following results, the subscripts denoting rpm., as previously pointed out:

|  | Control | I |
|---|---|---|
| Initial— | $V_2$ – 5,000 cps. | 25,000 cps. |
| (15 minutes after preparation) | $V_{20}$ – 4,400 cps. | 9,900 cps. |
| Ratio $V_2$ to $V_{20}$ | 1.1:1.0 | 2.5:1.0 |

It can be seen from the vlaue of $V_2/V_{20}$ that the yield value of the new composition is more than double that for the control.

EXAMPLE II

In this Example polyvinyl chloride was used as the vinyl halide polymer and dioctyl phthalate as the plasticizer to form the vinyl halide plastisol. Dythal was used as the stabilizer and the carboxyl polymer and neutralizer being the same as employed in Example I except different concentrations thereof were employed in the composition. The ingredients were mixed on a Cowles mixer at a temperature in the high thirties (Centigrade)

with the neutralizer being added last. The composition recipe, along with the control recipe, was as follows:

|  | Control | II |
|---|---|---|
| Polyvinyl chloride | 100 pts. | 100 pts. |
| Dioctyl phthalate | 58 | 58 |
| Dythal | 2 | 2 |
| Carboxyl polymer | — | 0.5 |
| Ethomeen C–25 | — | 1.5 |

Viscosity measurements were made, as in Example I, with the following results:

|  | Control | II |
|---|---|---|
| After aging 1 hour | $V_2$ – 8,000 cps. | 22,000 cps. |
|  | $V_{20}$ – 6,000 cps | 9,200 cps. |
| Ratio $V_2$ to $V_{20}$ | 1.3:1.0 | 2.17:1.0 |

Again with a much lower concentration of carboxyl polymer and neutralizer, than employed in Example I, the yield value of the new composition was almost twice that for the control.

EXAMPLE III

In this Example a series of compositions were made employing a different plasticizer from the previous Examples and varying the concentration of carboxyl polymer and neutralizing agent. The vinyl halide polymer employed was polyvinyl chloride and the carboxyl polymer was the same as Example I. The plasticizer employed was a mixture of Santocizer 315 and Santocizer 148. These Santocizers are made and sold by Monsanto Company and are believed to be a mixture of benzyl butyl phthalate and phosphate plasticizers. The recipes for the various compositions were as follows:

|  | III | IV | V | VI |
|---|---|---|---|---|
| Polyvinyl chloride | 100 | 100 | 100 | 100 |
| Santocizer 315 | 45 | 45 | 45 | 45 |
| Santocizer 148 | 13 | 13 | 13 | 13 |
| Dythal | 2 | 2 | 2 | 2 |
| Carboxyl polymer | 0.5 | 0.5 | 0.5 | 1.0 |
| Ethomeen C–25 | — | 1.5 | 0.75 | 3.0 |

Viscosity measurements were made, as in the previous Examples, with the following results:

|  | III | IV | V | VI |
|---|---|---|---|---|
| After aging 1 hour | $V_2$ – 6,000 cps | 13,800 cps. | 6,200 cps | 19,400 cps. |
|  | $V_{20}$ – 4,650 | 6,060 | 4,300 | 5,560 |
| Ratio $V_2$ to $V_{20}$ | 1.3:1.0 | 2.3:1.0 | 1.4:1.0 | 3.5:1.0 |

The above values show that sufficient carboxyl polymer and neutralizing agent must be used to get the yield value up. All of the compositions, including those in the previous Examples (I and II) exhibited practically no dilatancy over a period of about one week even though there was an increase in viscosity.

The compositions of the instant invention have many uses. By properly adjusting the yield value the compositions may be used as a base for medicinal applications, such as ointments and creams, in tooth paste, polishing and cleaning materials, such as cream type auto and furniture cleaners, and the like. They may be utilized in the preparation of textile printing pastes containing oil insoluble coloring pigments.

One particular valuable use of the instant compositions is in tufting mediums for making needle punched rugs and carpeting where high yield value is necessary and as low a dilantancy as possible is needed. A high yield, or high viscosity, is necessary in order to hold the yarn in position when it is punched or positioned in the tufting medium, in this case, the new compositions of the instant invention. The composition must not be dilatant so that it does not set up or gel when the myriad of needles are inserted therein. Further, the composition must be such that it does not stick to the needles when the same are withdrawn therefrom. The compositions of the present invention meet these requirements and due to the fact that the viscosity thereof increases with aging, the yarns become firmly locked in the compositions or tufting media. In addition to serving as a tufting medium, the compositions also serve as a coating for the carpet backing material to which it firmly adheres. Numerous other advantages and uses of the present invention will be apparent to those skilled in the art from reading the instant description.

While the present invention has been described in terms of its specific embodiments, certain modifications and equivalents will be apparent to those skilled in the art and are intended to be included within the scope of the present invention, which is to be limited only by the reasonable scope of the appended claims.

I claim:

1. A vinyl halide plastisol composition having a high yield value and substantially no dilatancy comprising an intimately blended mixture of (1) a vinyl halide resin selected from the group consisting of homopolymers of vinyl halides and copolymers of vinyl halides with one or more monomers having a —CH = C< grouping which are copolymerizable therewith in which the vinyl halide is in a major proportion; (2) as a plasticizer for said vinyl halide resin one or more liquid compounds selected from the group of alkyl and alkoxy alkyl esters of dicarboxylic acids; (3) a cross-linked carboxylic polymer obtained by copolymerizing at least 25 percent by weight of one or more alphabeta unsaturated carboxylic acids containing at least one carboxyl group and the olefinic double bond alpha-beta to at least one carboxyl group, with 0.1 percent to 30 percent by weight of a polyalkenyl polyether of a polyhydric alcohol containing more than one alkenyl ether grouping per molecule, the parent polyhydric alcohol containing at least 4 carbon atoms and at least 3 hydroxyl groups; and (4) as a last added ingredient of said composition, a neutralizing agent for said cross-linked carboxylic polymer comprising one or more compounds selected from the group consisting of ammonia;

alkali metal hydroxides, oxides, carbonates and bicarbonates; long chain aliphatic primary, secondary, tertiary and quaternary amines; and said amines treated with alkylene oxide to give compounds containing from 6 to 30 carbon atoms or more, said plastisol composition being free of water.

2. A composition as defined in claim 1 wherein (1) is polyvinyl chloride.

3. A composition as defined in claim 1 wherein (2) is dioctyl phthalate.

4. A composition as defined in claim 1 wherein (3) is a cross-linked copolymer of acrylic acid and allyl sucrose.

5. A composition as defined in claim 1 wherein (4) is coconut oil ethoxylated with 25 mols of ethylene oxide.

6. A composition as defined in claim 1 wherein (1) is a copolymer of more than 50 percent by weight of vinyl chloride and the remainder ethyl acrylate.

7. A composition as defined in claim 4 wherein (1) is polyvinyl chloride.

8. A composition as defined in claim 7 wherein (2) is dioctyl phthalate.

9. A composition as defined in claim 7 wherein (4) is coconut oil ethoxylated with 25 mols of ethylene oxide.

10. A composition as defined in claim 1 wherein (1) is polyvinyl chloride, (2) is dioctyl phthalate, (3) is a cross-linked copolymer of acrylic acid and allyl sucrose, and (4) is coconut oil ethoxylated with 25 mols of ethylene oxide.

11. A composition as defined in claim 10 wherein said composition contains an inorganic basic lead heat and light stabilizer.

12. A process for producing a vinyl halide composition having a high yield value and substantially no dilatancy which comprises intimately mixing (1) a vinyl halide resin selected from the group consisting of homopolymers of vinyl halides and copolymers of vinyl halides with one or more monomers having a $-CH=C<$ grouping which are copolymerizable therewith in which the vinyl halide is in a major proportion, with (2) a liquid plasticizer for said vinyl halide resin comprising one or more compounds selected from the group of alkyl and alkoxy alkyl esters of dicarboxylic acids, adding to said mixture from 0.5 to about 2.0 parts by weight, based on the weight of the composition of (3) a cross-linked carboxylic polymer obtained by copolymerizing at least 25 percent by weight of one or more alpha-beta unsaturated carboxylic acids containing at least one carboxyl group and the olefinic double bond alpha-beta to at least one carboxyl group, with 0.1 percent to 30 percent by weight of a polyalkenyl polyether of a polyhydric alcohol containing more than one alkenyl ether grouping per molecule, the parent polyhydric alcohol containing at least 4 carbon atoms and at least 3 hydroxyl groups; and thereafter adding to said mixture as a last ingredient (4) a neutralizing agent for said cross-linked carboxylic polymer comprising one or more compounds selected from the group consisting of ammonia; alkali metal hydroxides, oxides, carbonates and bicarbonates; long chain aliphatic primary, secondary, tertiary and quarternary amines; and said amines treated with alkylene oxide to give compounds containing from 6 to 30 carbon atoms or more, said neutralizing agent being employed in the range of about one part by weight to about ten parts by weight based on the total weight of the composition, and wherein said composition is free of water.

13. A process as defined in claim 12 wherein (1) is polyvinyl chloride.

14. A process as defined in claim 12 wherein (2) is dioctyl phthalate.

15. A process as defined in claim 12 wherein (3) is a cross-linked copolymer of acrylic acid and allyl sucrose.

16. A process as defined in claim 12 wherein (4) is coconut oil ethoxylated with 25 mols of ethylene oxide.

17. A process as defined in claim 16 wherein (1) is polyvinyl chloride, (2) is dioctyl phthalate, and (3) is a cross-linked copolymer of acrylic acid and allyl sucrose.

18. A process as defined in claim 17 wherein prior to the addition of (4) there is added to the mixture an inorganic basic lead heat and light stabilizer.

* * * * *